Aug. 19, 1969 G. G. COPELAND 3,462,246
FLUIDIZED BED REACTOR WITH IMPROVED CONSTRICTION PLATE
Filed May 16, 1966 4 Sheets-Sheet 1
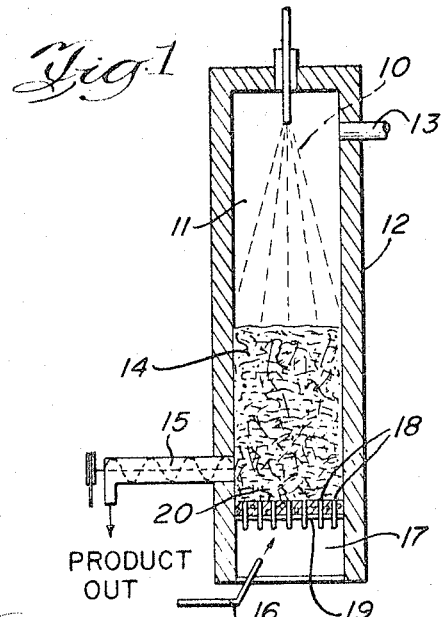
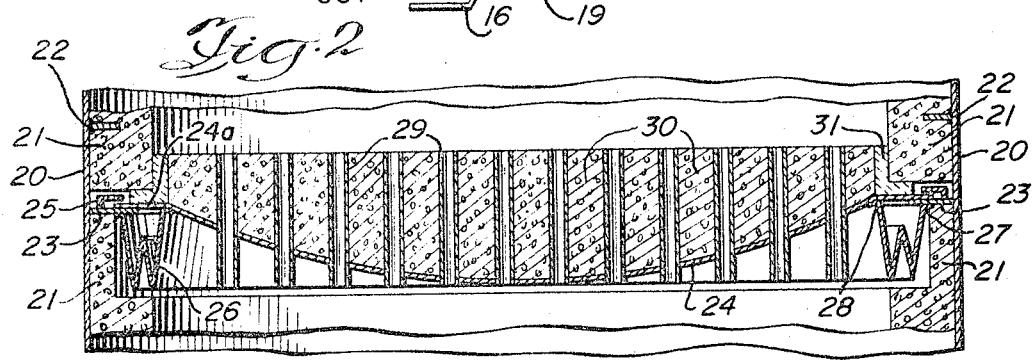
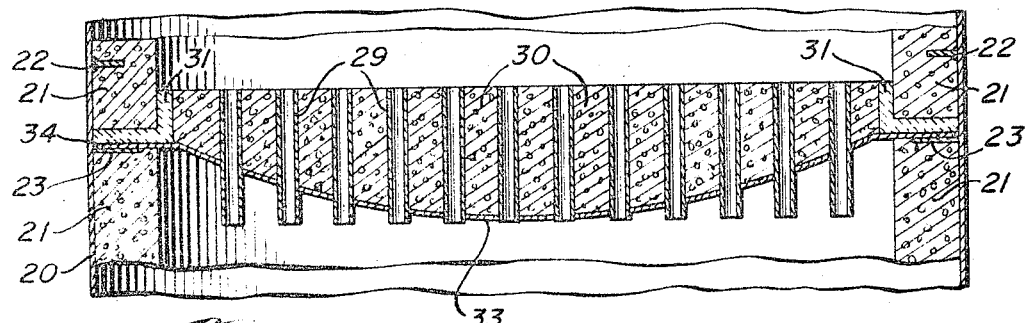
Inventor
George G. Copeland
By Merriam, Marshall, Shapiro & Klose
Attorneys

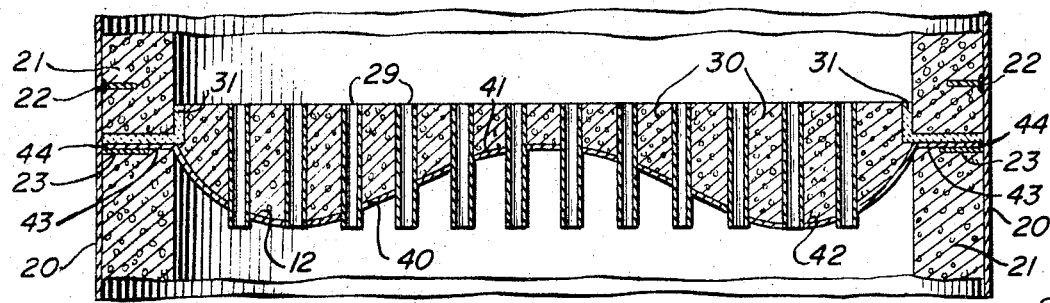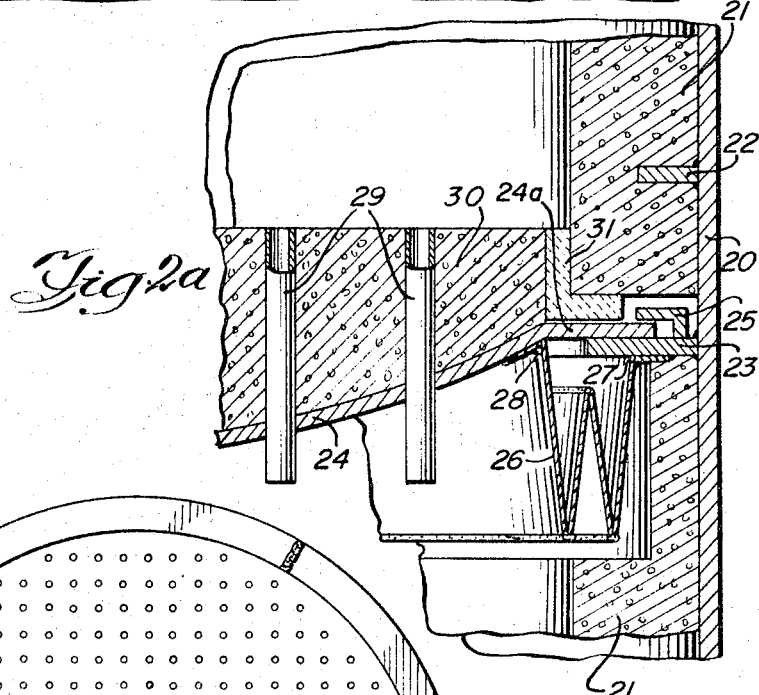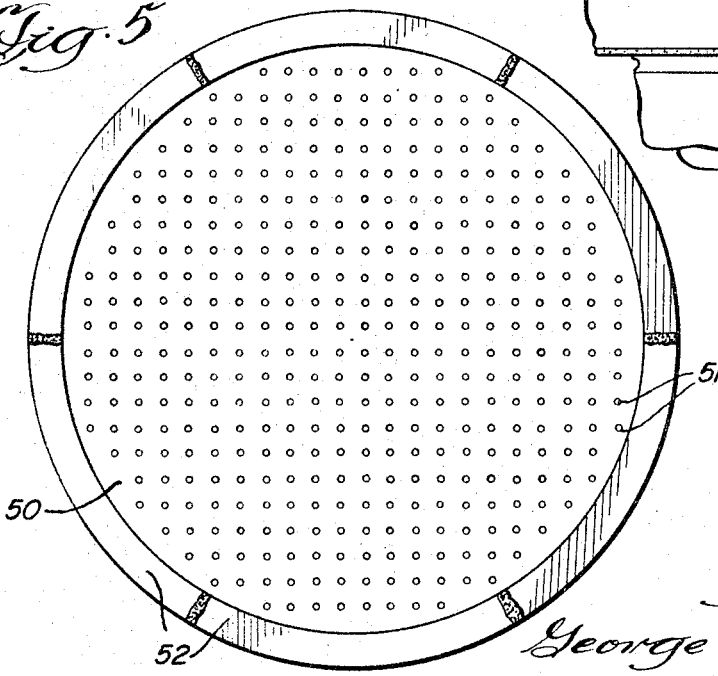

Aug. 19, 1969  G. G. COPELAND  3,462,246
FLUIDIZED BED REACTOR WITH IMPROVED CONSTRICTION PLATE
Filed May 16, 1966  4 Sheets-Sheet 3

Inventor
George G. Copeland
By Merriam, Marshall, Shapiro & Klose
Attorneys

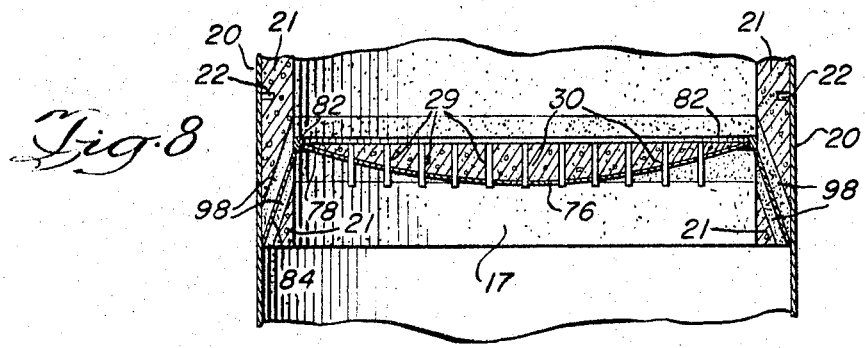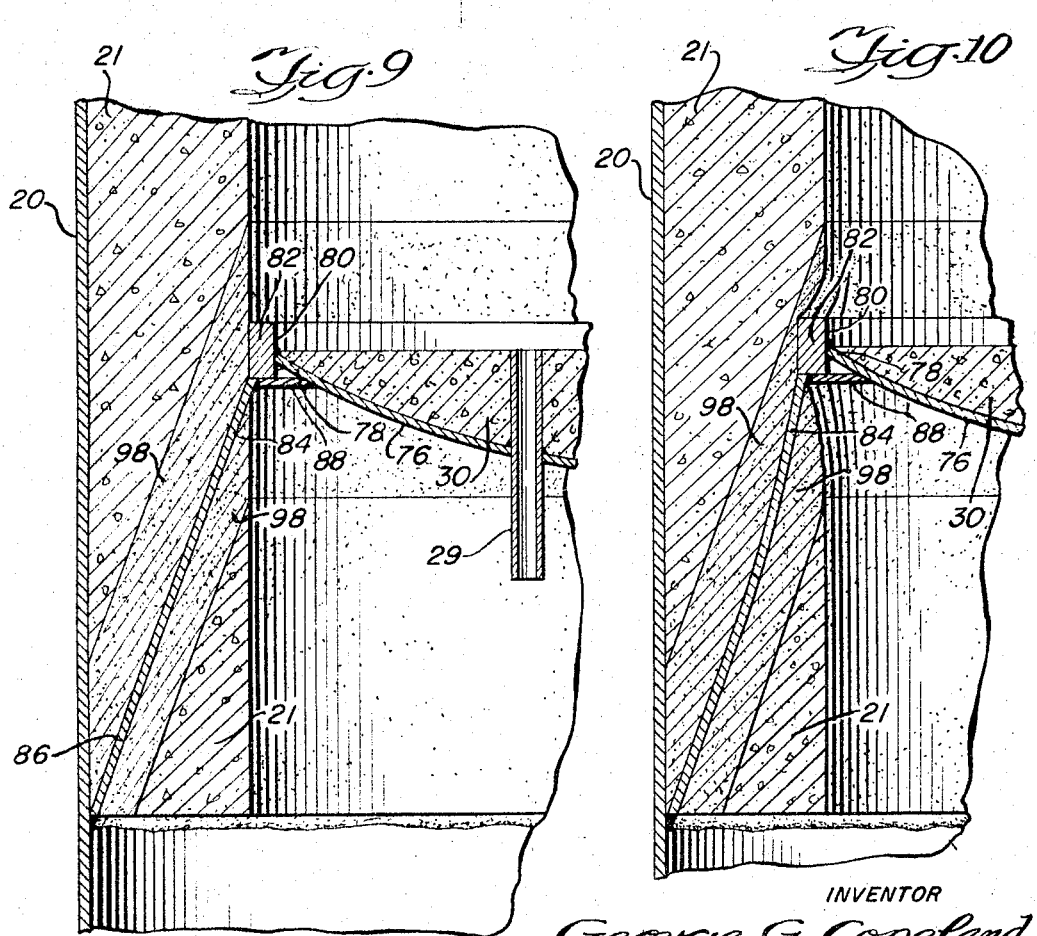

United States Patent Office 3,462,246
Patented Aug. 19, 1969

1

3,462,246
FLUIDIZED BED REACTOR WITH IMPROVED
CONSTRICTION PLATE
George G. Copeland, Wheaton, Ill., assignor to Container Corporation of America, Chicago, Ill., a corporation of Delaware
Continuation-in-part of application Ser. No. 460,163, June 1, 1965. This application May 16, 1966, Ser. No. 557,593
Int. Cl. F27b 15/02; B01j 9/18
U.S. Cl. 23—284                                     5 Claims

ABSTRACT OF THE DISCLOSURE

An improved constriction plate for walled fluidized bed reactors wherein the construction plate is dished radially from the center in one axial direction perpendicular to the constriction plate and then dished in the other direction. Refractory insulation is placed on the top side of the plate and tubular conduits extend through orifices in the plate, surrounded by protective tubes on the upper side of the plate. An alternate supporting skirt and a stiffening ring bar is provided to enable the plate to expand and contract uniformly and substantially only in horizontal or lateral movement with relatively minor deformation of the constriction plate.

This application constitutes a continuation-in-part of the previous application of this inventor, namely, Ser. No. 460,163, filed June 1, 1965, now abandoned.

This invention relates to improvements in processing reactors. More particularly, this invention is concerned with an improved constriction plate in a walled fluidized bed reactor.

Fluidized bed reactors are used in many processes because of their efficient handling and conversion properties. Thus, in pending U.S. patent application Ser. No. 210,305 filed July 12, 1962, U.S. Patent 3,309,265, issued Mar. 14, 1967, there is disclosed a process of treating waste pulping liquor in a fluidized bed reactor.

In that process, which shall be described in conjunction with FIG. 1 of the drawings of the subject application, waste pulping liquor is first concentrated by evaporation from about 10 percent solids to about 20 to 45 percent solids by weight. The concentrated waste liquor is then sprayed 10 into the freeboard area 11 of a fluidized bed reactor 12 operating at a temperature of about 1200° F. to 1600° F. Much of the water content is evaporated from the liquor in the freeboard area and is withdrawn through pipe 13 with other effluent gases. The thus further concentrated liquor then contacts the fluidized bed 14 where autogenous combustion of the organic materials in the liquor takes place. The fluidized bed is advisably particles of material having the same composition as the inorganic content of the waste pulping liquor. As the fluidized bed volume increases through deposition of the inorganic content by combustion of the liquor, screw removal means 15 can be used to remove any part of the bed. The bed is maintained fluidized by air which is supplied by pipe 16 to windbox 17 under pressure. The air then passes through orifices 18 in constriction plate 19. The constriction plate and orifices serve to distribute the air uniformly across the fluidized material.

The orifices are usually tubular elements and can be of any suitable size to provide proper air distribution for fluidization of the bed. Inslating material 20 is placed on top of the constriction plate because of the high temperatures in the fluidized bed.

The constriction plate 19 has in the past been made of metal, usually steel, of a planar or flat configuration which was joined at its periphery by welding it to the wall of the reactor. Such constriction plates were found

2 to be unsatisfactory because they cracked and buckled during start-up of the reactor and this in turn caused the insulation on the top to be disrupted, crack and disintegrate with further damage being caused by heat penetration from the fluidized bed during operation.

While insulation on top of the plate provided protection against heat during operation of the reactor it offered no protection against the heat needed to start or fire the reactor. To fire the reactor, or raise the temperature of the fluidized bed to a temperature which induces autogenous combustion of the concentrated waste pulping liquor, heated air or oxygen is pumped in pipe 16 to windbox 17. The hot air, at temperatures from 1000° F. to 1500° F., not only heats the fluidized bed but raises the temperature of the constriction plate 19 as well. As a result the plate expands and buckles. Once the bed has been fired, air at temperatures of about 250° F. is fed into the windbox. This cools the constriction plate which shrinks, twists and sometimes cracks.

It has now been found according to the present invention that by making the metal constriction plate non-planar or dished, heating the constriction plate during start-up operations, or by increased temperatures to which it may be subjected during later operation, is accomplished without cracking the plate and adverse buckling of the plate is avoided and the integrity of the insulation on top of the plate preserved. The dished structure of the plate provides a path for the metal to expand and contract, when heated and cooled, without cracking or distorting the plate.

The invention will now be discussed further with reference to FIGS. 2 to 7 in which:

FIG. 2 is a vertical sectional view through that part of a fluidized bed reactor having an improved constriction plate according to this invention;

FIG. 2a is an enlarged sectional view of one end of the constriction plate shown in FIG. 2 and means to support it in place;

FIG. 3 is similar to FIG. 2 but shows another arrangement for joining the constriction plate to the reactor wall;

FIG. 4 is a vertical sectional view through a fluidized bed reactor having another constriction plate embodiment of the invention;

FIG. 5 is a top plane view of a constriction plate showing the position of the orifices;

FIG. 8 is a vertical sectional view through a fluidized bed reactor having an alternative constriction plate embodiment of the invention;

FIG. 9 is an enlarged fragmentary view of one end of the constriction plate shown in FIG. 8; and FIG. 10 is the same view as in FIG. 9 illustrating lateral movement of the constriction plate during operation of the reactor.

In the following discussion, similar elements which appear in more than one of the drawing figures shall be referred to by the same number unless otherwise designated.

Figure 3A:
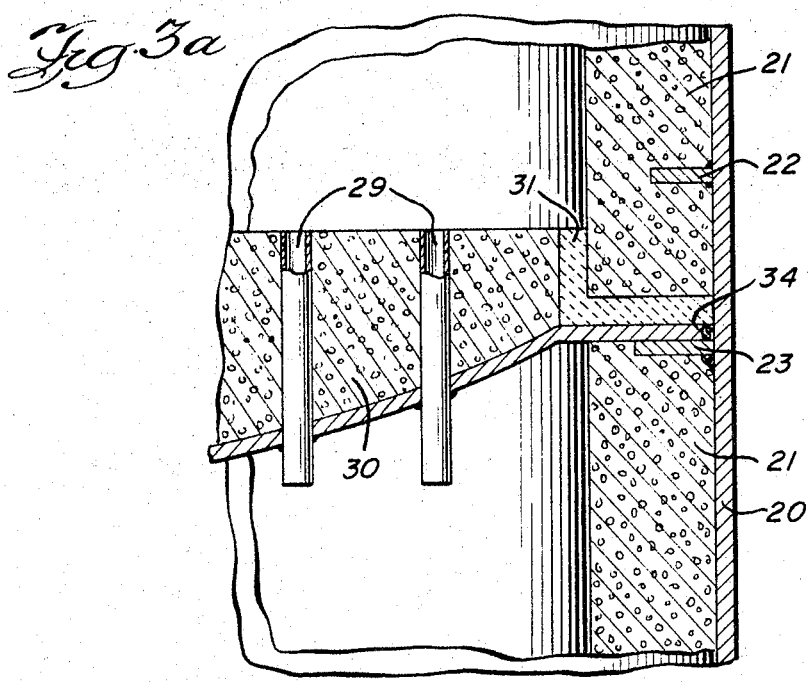
FIG. 3a is an enlarged sectional view of one end of the constriction plate shown in FIG. 3 and means to support it in place.

With reference to FIGS. 2 and 2a, reactor metal walls 20 are internally insulated 21. Flange 22 is welded to the reactor walls to provide support for the wall insulation. Also projecting from the reactor walls is support flange 24a upon which the peripheral edge 23 of constriction plate 24 rests in slidable arrangement. Angle 25 is welded to flange 23 and is positioned to have one web extend over the end of the constriction plate. This is to provide a protected expansion area for the end of the constriction plate. Expansion diaphragm 26 is welded at its upper extremity 27 to the bottom of flange 23, and at upper extremity 28 to the bottom of the constriction plate. The diaphragm 26, essentially W-shaped in cross-section, permits the constriction plate to expand while maintaining an airtight seal between the constriction plate and the reactor walls. Orifice tubes 29 are provided in the constriction plate and refractory insulation 30 placed on top of the plate. Resilient insulation 31 is provided as a joint between the reactor wall insulation and insulation on top of the plate.

The constriction plate 24 is dished for almost its entire area. It thus is shaped like a spherical shell element from about the center towards the plate periphery. Although the drawings show the constriction plate with the concave side up, it is within the contemplation of this invention to place the convex side up. A dished constriction plate ⅝ inch thick such as described can deflect vertically up to 8 inches, and expand laterally 2 inches, or more during start-up operations of a fluidized bed cylindrical reactor having a diameter of about 10 to 20 feet without cracking or buckling the plate or adverse effect on or disruption of the insulating refractory layer.

The structure shown in FIGS. 3 and 3a is the same as that in FIGS. 2 and 2a except that the constriction plate 33 in FIGURES 3 and 3a, which rests on flange 23, is directly welded at its peripheral edge 34 to a reactor wall 20. A direct connection of this type also serves to keep air from escaping from the windbox except through orifices 29. A ⅝ inch thick constriction plate, as shown in FIG. 3, in a 10-foot diameter reactor at 1300° F. depresses in the center up to 12 inches and on cooling returns to its original configuration without distortion.

The constriction plate 40 of FIG. 4 has, in cross section through the central perpendicular axis, a central convex dished portion 41 and extending radially therefrom a concave ring portion 42 which extends circularly about the outer portion of the constriction plate. The edge portion 43 of constriction plate 40 is welded at its end 44 to the reactor 20 wall.

The top planar view of FIG. 5 shows a circular constriction plate 50 containing a plurality of tubular orifices 51. The spacing and number of orifices will depend on the type of bed to be fluidized by the air passing through the bed and the reaction rate desired in the bed. The constriction plate is concavely dished, as in FIG. 2. The dished depth can be about 5 to 10 inches for a plate about 10 to 15 feet in diameter. After dishing, flat ring segments 52 can be welded about the edge to support the plate in the reactor.

Figure 6:
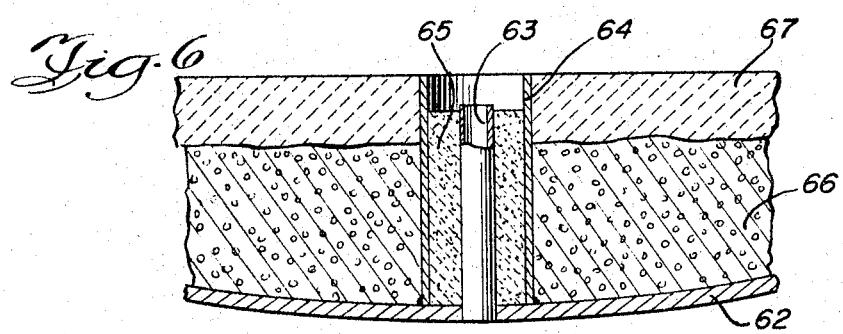
FIG. 6 is a vertical section through an insulated constriction plate and shows an arrangement for positioning the orifice tubes.

FIG. 6 illustrates construction for holding an orifice tube in position that will successfully withstand wide temperature cycles to which the constriction plate can be subjected. Constriction plate 62 of metal is provided with a hole in which metal orifice tube 63 is placed. Surrounding tube 63 axially is protective metal tube 64 welded at its bottom to plate 62. Resilient refractory material 65 is placed in tube 64 to a height just below the top of orifice tube 63. Loose refractory grog 66 is positioned on top of the constriction plate and over the grog 66 is placed a castable refractory material 67 to the top level of protective tube 64.

Figure 7:
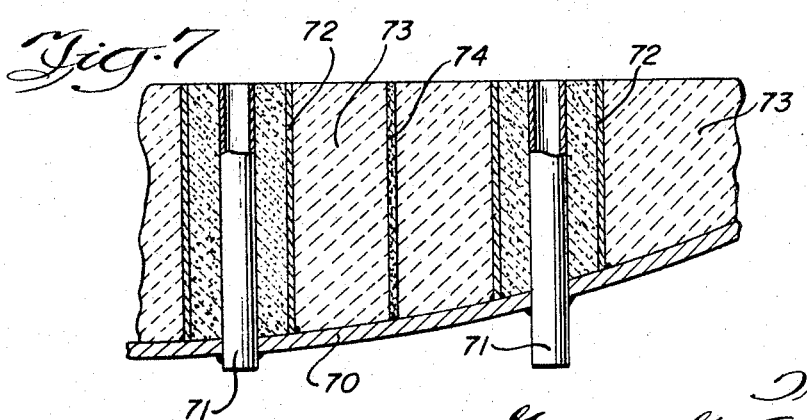
FIG. 7 is a vertical section through an insulated constriction plate and shows another arrangement for positioning the orifice tubes.

In FIG. 7, constriction plate 70 is provided with holes through which orifice tubes 71 extend. Axially arranged protective tubes 72 surround orifice tubes 71. The protective tubes 72 are filled with resilient refractory insulation. The remainder of the upper surface of the constriction plate is covered with refractory blocks 73 precast to fit level on the plate and to surround the protective tube 72. Resilient refractory material 74 is placed between the blocks 73 to provide a flexible joint. Insulation placed on a constriction plate in this manner retains its integrity through many and drastic temperature cycles to which the constriction plate may be subjected.

In FIGURE 8 and the fragmentary view in FIG. 9 there is illustrated an alternative constriction plate embodiment of the present invention. A constriction plate 76 is welded at its peripheral edge 78 to an inside face 80 of a ring bar 82. The ring bar 82 has cross-sectional dimensions of approximately 2¼ inches x 4½ inches and provides stiffening to the peripheral edge of the constriction plate.

The constriction plate and ring bar assembly is supported by a supporting skirt 84. One end 86 of the support skirt 84 is welded at its outer edge to the reactor wall 20. The ring bar 82 is welded to a flat portion 88 at the other end of the support skirt 84. If desired, the constriction plate 76 may also be welded to the flat portion 88 at the contacting edge. The supporting skirt 84 is formed of relatively thin metal having a cross-sectional dimension of approximately ¼ inch. It may be particularly noted that in this embodiment of the invention the stiffening action provided by the ring bar 82 and the spring-like action of the relatively thin support skirt 84 enables the constriction plate 76 to expand and contract uniformly in substantially only a horizontal or lateral movement with relatively minor deformation of the constriction plate.

Reference may be had to FIGURE 10 wherein there is shown the expansion and corresponding horizontal movement of the constriction plate, with the resulting deflection of the supporting skirt 84. Resilient insulation 98 both above and below the support skirt 84 provides a flexible insulating joint between the reactor wall insulation 21 and the support skirt 84. Thus, the constriction plate does not distort or deform to any great extent and substantially expands only in a horizontal manner.

The foregoing detailed description has been given for clearness of understanding only, and no unnecessary limitations should be understood therefrom, as modifications will be obvious to those skilled in the art.

What is claimed is:
1. In a walled fluidized bed reactor:
   a metal constriction plate which extends across at least a substantial part of the area between the reactor walls,
   a plurality of orifices located in the plate permitting air flow from a windbox below the plate to a fluidized bed above the plate, and
   refractory insulation on the top side of the plate, said metal plate being dished radially from the center first in one axial direction perpendicular to the plate and then the other direction, wherein the top center portion of the plate is axially convex and beyond the convex portion is a dished concave radial ring top portion.
2. In a reactor according to claim 1, in which the orifices are tubular conduits which extend through holes in the plate and protective tubes surround the tubular conduit on the upper side of the plate both on said axially convex portion and on said concave ring top portion of said plate.
3. In a reactor according to claim 2, in which stiffening means interconnected the periphery of the constriction plate and including a flexible supporting skirt extending upwardly from said walled reactor and being connected to said constriction plate by said stiffening means, said stiffening means comprising a ring bar for enabling the constriction plate to expand and contract substantially only laterally in a non-deforming manner with extreme temperature changes.
4. In a walled fluidized bed reactor:
   a metal constriction plate which extends across at least a substantial part of the area between the reactor walls,
   a plurality of orifices located in the plate permitting air flow from a windbox below the plate to a fluidized bed above the plate, said orifices having a first end below the plate lying substantially in a first plane, and a second end above the plate lying substantially in a second plane, and refractory insulation on the top side of the plate, said metal plate being dished radially from the center first in one axial direction perpendicular to the plate and then the other direction.

said oppositely dished portions enabling said constriction plate to expand and contract with temperature changes while maintaining said orifice ends substantially in said respective planes.

5. In a reactor according to claim 4 in which the orifices are tubular conduits which extend through holes in the plate, and the respective ends of said conduits continue to lie in respective planes during expansion and contraction of said plate.

References Cited

UNITED STATES PATENTS

| | | | |
|---|---|---|---|
| 2,607,663 | 8/1952 | Perry et al. | 23—288 |
| 2,690,962 | 10/1954 | Clarke | 23—288 |
| 2,715,565 | 8/1955 | McKay | 23—277 |
| 2,836,902 | 6/1958 | North | 34—57 |

JAMES H. TAYMAN, JR., Primary Examiner

U.S. Cl. X.R.

23—277, 288; 34—10, 57; 52—573; 263—21

UNITED STATES PATENT OFFICE
CERTIFICATE OF CORRECTION

Patent No. 3,462,246                      August 19, 1969

George G. Copeland

It is certified that error appears in the above identified patent and that said Letters Patent are hereby corrected as shown below:

Column 1, line 38, "3,309,265" should read -- 3,309,262 --; Column 2, line 70, "24a" should read -- 23 --; same line 70, "edge 23" should read -- edge 24a --.

Signed and sealed this 19th day of May 1970.

(SEAL)
Attest:

Edward M. Fletcher, Jr.                    WILLIAM E. SCHUYLER, JR.

Attesting Officer                         Commissioner of Patents